(12) United States Patent
Schaer et al.

(10) Patent No.: US 11,839,951 B2
(45) Date of Patent: Dec. 12, 2023

(54) METHOD OF CLEANING A COMPONENT HAVING A THERMAL BARRIER COATING

(71) Applicant: Siemens Energy, Inc., Orlando, FL (US)

(72) Inventors: Robert Schaer, Edgewater, FL (US); Mahmood K. Silieti, Orlando, FL (US); Rafael A. de Cardenas, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 237 days.

(21) Appl. No.: 17/270,186

(22) PCT Filed: Sep. 20, 2018

(86) PCT No.: PCT/US2018/051833
§ 371 (c)(1),
(2) Date: Feb. 22, 2021

(87) PCT Pub. No.: WO2020/060550
PCT Pub. Date: Mar. 26, 2020

(65) Prior Publication Data
US 2021/0308829 A1 Oct. 7, 2021

(51) Int. Cl.
*B24C 1/08* (2006.01)
*B08B 7/00* (2006.01)
*F01D 5/00* (2006.01)
*F01D 5/28* (2006.01)

(52) U.S. Cl.
CPC .................. *B24C 1/08* (2013.01); *B08B 7/00* (2013.01); *B24C 1/086* (2013.01); *F01D 5/005* (2013.01); *F01D 5/288* (2013.01); *F05D 2230/80* (2013.01); *F05D 2230/90* (2013.01)

(58) Field of Classification Search
CPC ........ B24C 1/08; B24C 1/086; F05D 2230/90
See application file for complete search history.

(56) References Cited

U.S. PATENT DOCUMENTS

| 4,774,150 A | * | 9/1988 | Amano | ..................... | C23C 4/02 |
| | | | | | 415/174.4 |
| 6,380,512 B1 | | 4/2002 | Emer | | |
| 6,402,593 B1 | | 6/2002 | Shaw | | |

(Continued)

FOREIGN PATENT DOCUMENTS

| CN | 1716524 A | 1/2006 |
| CN | 108118278 A | 6/2018 |

(Continued)

OTHER PUBLICATIONS

Machine translation: JP2014159641; Kaneko et al. (Year: 2014).*

(Continued)

*Primary Examiner* — Natasha N Campbell

(57) ABSTRACT

A method of cleaning a component includes providing the component following the operation of the component in a high temperature environment, the component including a thermal barrier coating (TBC), cleaning the TBC of the component using a sponge jet blasting process, and measuring a cleaned thickness of the TBC to verify that the cleaned thickness exceeds a predetermined minimum value that will allow the return of the component to the high temperature environment.

16 Claims, 4 Drawing Sheets

(56) References Cited

U.S. PATENT DOCUMENTS

| | | | |
|---|---|---|---|
| 7,465,215 B2 | 12/2008 | Shimizu et al. | |
| 2005/0137829 A1 | 6/2005 | Gimelfarb et al. | |
| 2005/0235493 A1 | 10/2005 | Philip et al. | |
| 2010/0072072 A1* | 3/2010 | Beckel | F01D 5/005 |
| | | | 205/205 |
| 2013/0295278 A1 | 11/2013 | Zhang et al. | |
| 2014/0273747 A1 | 9/2014 | Markowski et al. | |

FOREIGN PATENT DOCUMENTS

| | | | |
|---|---|---|---|
| EP | 3372784 A1 | | 9/2018 |
| JP | 2001169562 A | * | 6/2001 |
| JP | 2004156444 A | | 6/2004 |
| JP | 2004190602 A | | 7/2004 |
| JP | 4716084 B2 | | 7/2011 |
| JP | 2014092112 A | | 5/2014 |
| JP | 2014159641 A | | 9/2014 |
| RU | 2118917 C1 | | 9/1998 |

OTHER PUBLICATIONS

Machine translation: JP2004169562A; Kikuchi et al. (Year: 2004).*
PCT International Search Report and Written Opinion of International Searching Authority dated Jun. 17, 2019 corresponding to PCT International Application No. PCT/US2018/051833 filed Sep. 20, 2018.

* cited by examiner

| Blade Location | Blade No. 1 Loss | Blade No. 2 Loss | Blade No. 3 Loss |
|---|---|---|---|
| 1 | 0.43 | 0.94 | 0.55 |
| 2 | 1.42 | 0.59 | 0.43 |
| 3 | 1.56 | 1.29 | 1.07 |
| 4 | 0.86 | 1.13 | 1.24 |
| 5 | 1.02 | 0.36 | 1.20 |
| 6 | 1.68 | 0.58 | 0.41 |
| 7 | 0.87 | 1.42 | 0.45 |
| 8 | 0.81 | 0.92 | 1.13 |
| 9 | 1.21 | 0.53 | 0.46 |
| 10 | 1.99 | 0.46 | 1.57 |
| 11 | 1.61 | 2.16 | 1.49 |
| 12 | 1.03 | 0.78 | 2.33 |
| Average | 1.21 | 0.93 | 1.03 |

METHOD OF CLEANING A COMPONENT HAVING A THERMAL BARRIER COATING

TECHNICAL FIELD

The present disclosure is directed, in general, to a method of refurbishing high-temperature components. and more specifically to refurbishing high-temperature components that include a thermal barrier coating (TBC).

BACKGROUND

In order to improve the efficiency of gas turbine engines, higher and higher operating temperatures have been used. The higher temperatures have required advances in materials including the more common use of thermal barrier coatings (TBC). Components that are exposed to the hot combustion gases can include a TBC to protect the component from the high-temperatures as well as the corrosive elements within the combustion gases. Typical TBCs include a ceramic material that can be easily damaged during operation. In addition, the TBC is typically replaced periodically to assure sufficient TBC thickness is maintained during operation.

SUMMARY

A method of cleaning a component includes providing the component following the operation of the component in a high temperature environment, the component including a thermal barrier coating (TBC), cleaning the TBC of the component using a sponge jet blasting process, and measuring a cleaned thickness of the TBC to verify that the cleaned thickness exceeds a predetermined minimum value that will allow the return of the component to the high temperature environment.

In another construction, a method of cleaning a component includes providing a component that has operated in a high temperature environment, the component including a thermal barrier coating (TBC), measuring a first thickness of the TBC to verify that the first thickness is greater than a predetermined threshold value, and selecting an operating parameter of a sponge jet blasting process. The method also includes cleaning the TBC of the component using the sponge jet blasting process and measuring a second thickness of the TBC to determine the amount of TBC removed during the cleaning and to verify that the thickness exceeds a predetermined minimum value that will allow the return of the component to the high temperature environment.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this specification and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

Figure 1:
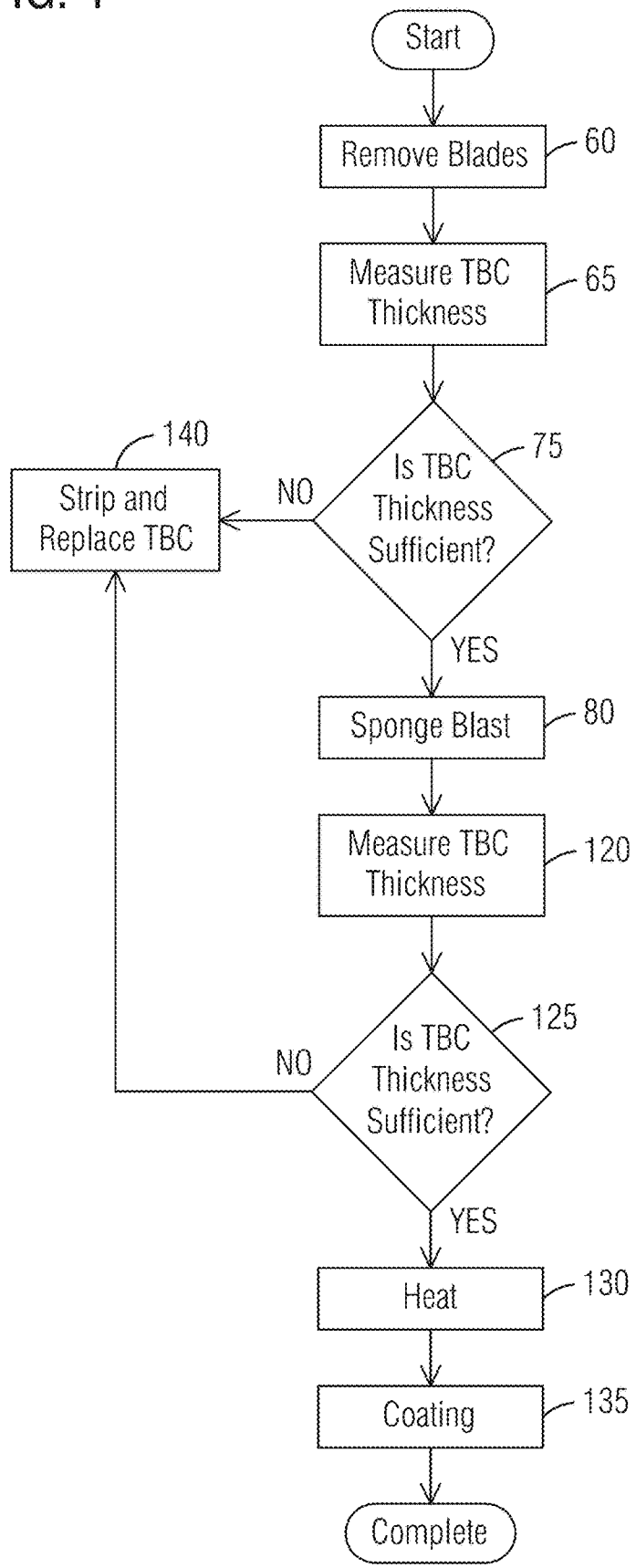
FIG. 1 is a flow chart illustrating a repair or refurbishment process for a component including a thermal barrier coating (TBC).

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Also, it should be understood that the words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard as available a variation of 20 percent would fall within the meaning of these terms unless otherwise stated.

Figure 6:
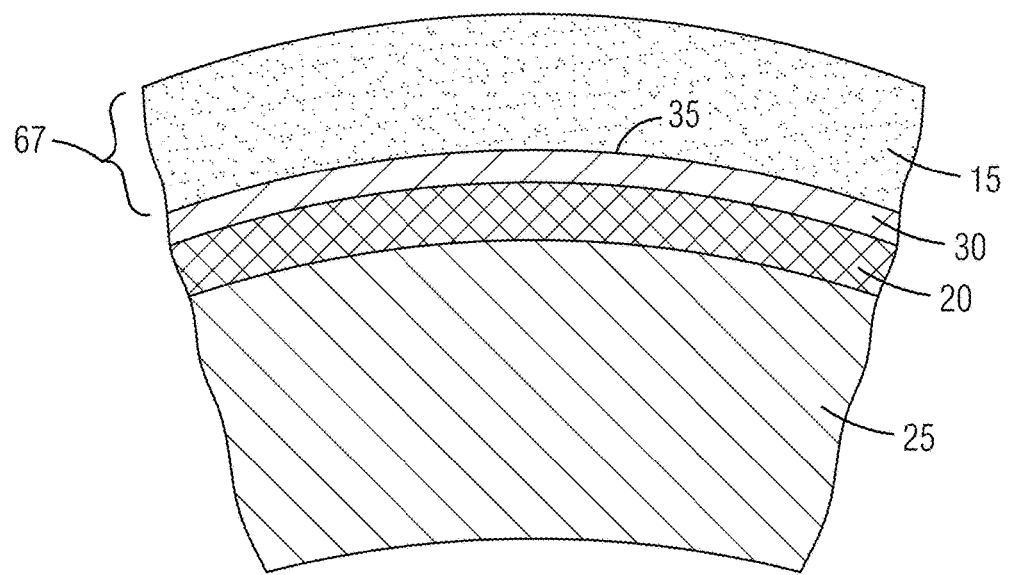
FIG. 6 is a schematic cross section of a surface of a component that includes a TBC.
Figure 7:
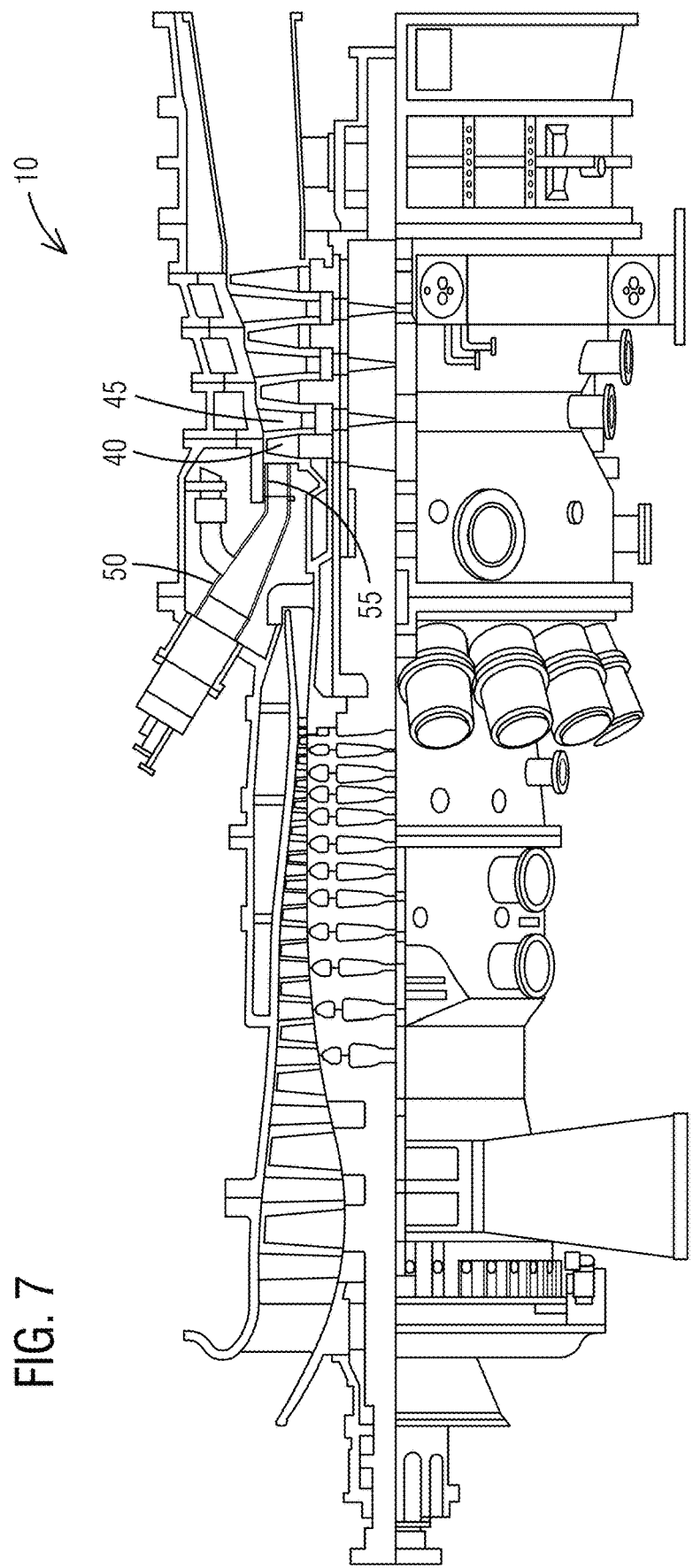
FIG. 7 is a cross-section of a gas turbine including blades, vanes, baskets, transitions, and other components that include TBCs.

Gas turbines 10, and in particular large gas turbines (FIG. 7) for use in power generation include combustion sections and turbine sections that operate at very high temperatures. To protect the components from the high temperatures and from corrosion due to contact with elements in the combustion gases, many components include a thermal barrier coating 15 (referred to herein as a "TBC"). As illustrated schematically and not to scale in FIG. 6, TBCs 15 are thin layers of material applied to the exposed surface of the component. Often, the TBC 15 is applied to a bond coat layer 20 that is directly applied to a substrate 25 or surface of the component being protected by the TBC 15. The bond coat 20 is selected to provide a desired bond to the substrate 25 but to also provide for sufficient bonding of the TBC 15. In some constructions, a thermally-grown oxide layer 30 is formed between the bond coat 20 and the TBC 15 to improve the bonding of the TBC 15 as illustrated in FIG. 6. The selection of materials for the bond coating 20 and the oxide layer 30, if employed are not critical to the invention and are selected based on design considerations such as the material used for the substrate 25, the difference in the coefficients of thermal expansion between the substrate 25 and the TBC 15, and other considerations that are not critical to the invention.

In most constructions, the TBC 15 is a ceramic material such as an yttria-stabilized zirconia. In some constructions, the TBC 15 includes a pyrochlore-based ceramic or zirconia-based TBC with yttria stabilized zirconia (e.g., 8YSZ) being well-suited in this application. Typical application of the TBC 15 utilizes an atmospheric plasma spray process (APS) that produces an interface line 35 between the TBC 15 and the layer of material (bond coating 20) to which the TBC 15 is applied. Of course, other TBCs 15 could be employed as desired.

Following a predetermined period of operation in a gas turbine engine 10, many components require periodic maintenance and inspection. One example of such a component are the various turbine blades 40 (rotating) positioned within the turbine section of the engine 10. Other components could include vanes 45 (stationary) baskets 50, transitions 55, or any other components (shown in FIG. 7) that include the TBC 15. As one of ordinary skill will understand, the process described herein could be applied to any of these components including the TBC 15. The remaining description focuses on the repair/refurbishment of the blade 40, but it is clear that the invention should not be limited to just blades 40 as the component.

FIG. 1 is a flowchart that outlines the basic process for repairing/refurbishing the turbine blade 40 following operation at an elevated operating temperature for a predetermined period of time. With reference to FIG. 1, the initial step in the process is to remove the blades 60 from service. Each blade 40 is repaired or refurbished individually and therefore must be removed from the turbine rotor to allow for individual processes to be applied as necessary.

Figures 2, 3:
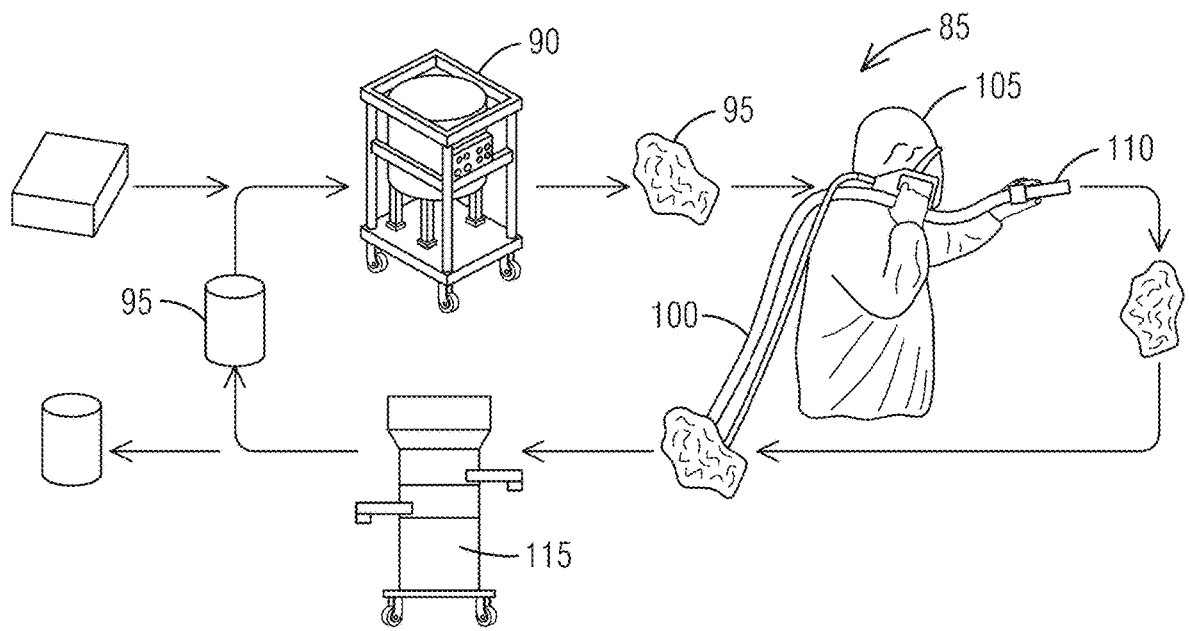
FIG. 2 is schematic illustration of a sponge jet system suitable for use in cleaning TBCs on components.
FIG. 3 is a chart illustrating examples of cleaned turbine blades and TBC thickness changes.

Each blade 40 is next inspected using various non-destructive examination (NDE) techniques. One inspection is an inspection 65 of a thickness 67 of the TBC 15 at various locations on each blade 40. While several different techniques could be used to perform such an inspection 65, eddy current inspection is preferred. The eddy current inspection can easily detect the interface line 35 between the TBC 15 and the bond coating 20 to which it was attached to measure the thickness 67 of the TBC 15. FIG. 3 includes a table 70 for three blades 40 that were inspected at twelve different locations. The data includes the loss in thickness 67 for the TBC layer 15, in microns, as a result of the repair or refurbishment at the different locations.

Once the thickness 67 of the TBC 15 is measured, an analysis is conducted 75 to assure that following the repair/refurbishment process sufficient TBC 15 will remain for continued operation to the next planned inspection and repair. For example, one component may require a minimum TBC thickness 67 of twelve microns or more before the process can be carried out. If any of the measured thicknesses 67 fall below the minimum thickness 67, the TBC 15 must be stripped and reapplied (step 140) before the blade 40 or other component can be put back into service. For the blades 40 documented in the table of FIG. 3, all the measured locations exceed the minimum TBC thickness 67 making the blades 40 suitable for the repair/refurbishment process.

The next step in the repair/refurbishment process is to sponge blast 80 the blades 40 and in particular the areas including the TBC 15. In prior repairs, grit blasting was used to remove the TBC 15 completely to allow for the reapplication of the TBC 15. However, through significant testing and experimentation it has been found that if the proper parameters are employed, the sponge blasting process can be used to clean the blades 40, or other components, without removing too much of the TBC 15.

FIG. 2 illustrates a sponge blasting arrangement 85 which includes a main feed unit 90 that provides the desired media 95 to an air stream 100 at a desired rate. Air can be provided by a separate air compressor or other source and is regulated to provide air at the desired operating pressure. A user 105 operates a nozzle or gun 110 that directs air and media at the surfaces to be cleaned. The nozzle or gun 110 further regulates the air to maintain the desired feed pressure. A recycler 115 can be provided to collect the used media 95 and redirect the used media 95 to the feed unit 90 for reuse. The recycler 115 separates the still usable media 95 from media 95 that is damaged or degraded to the point that it can no longer be used. Additional components may be employed to enhance the sponge blasting system 85 as desired.

In the sponge blasting process, air 100 at an operating pressure is mixed with the blasting media 95 with both the air 100 and media 95 being directed at the component under a feed pressure. The selection of the operating pressure, the media 95, and the feed pressure each affect the quality of the cleaning process and the amount of TBC 15 that is removed. In one arrangement, the operating pressure is between 35 and 55 psi with about 45 psi plus or minus 5 psi being more preferred and the feed pressure is between 20 and 40 psi with about 30 psi plus or minus 5 psi being preferred.

While a number of media 95 are available for the sponge blasting process, one media 95 found particularly suitable is a sponge base impregnated with aluminum oxide having a grit between 200 and 400 and more preferably between 300 and 350. More abrasive or aggressive media or less aggressive media is also available. It should be noted that the aforementioned 200 to 400 grit aluminum oxide media works well with the pressures defined above. If a different media is selected, the aforementioned pressures may need to be adjusted as well.

Figure 4:
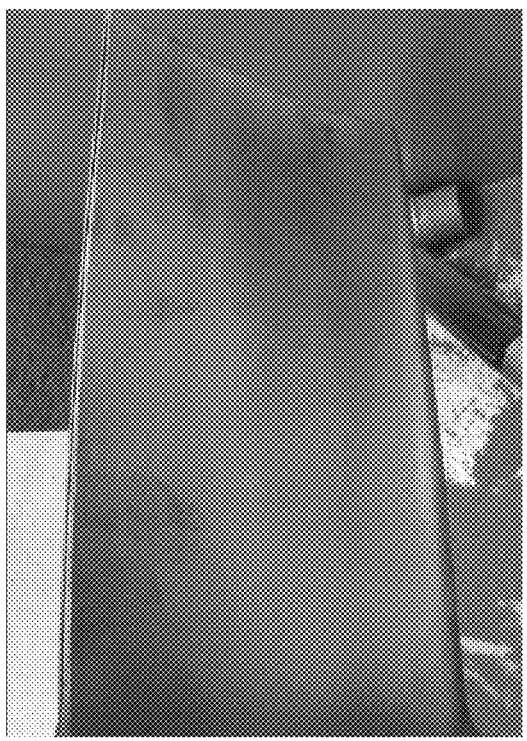
FIG. 4 is an image of a portion of a turbine blade prior to the cleaning process.
Figure 5:
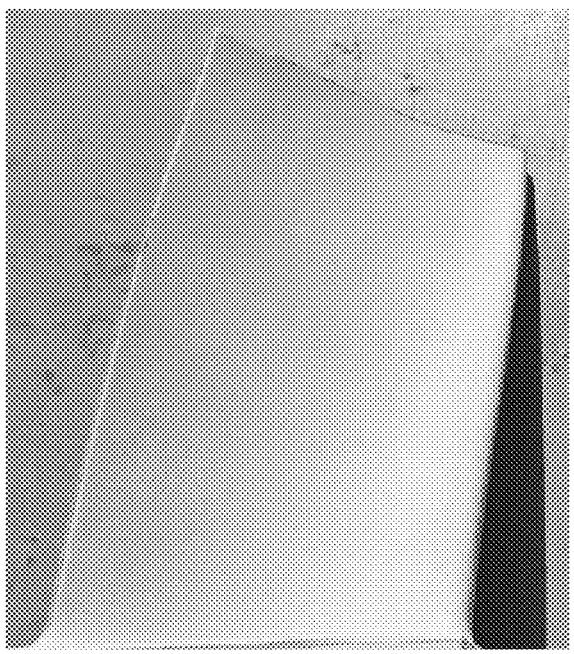
FIG. 5 is an image of a portion of a turbine blade following the cleaning process.

FIG. 4 illustrates the turbine blade 40 prior to the sponge blasting step 80 (FIG. 1) and FIG. 5 illustrates the turbine blade 40 following the sponge blasting step 80. Following the sponge blasting step 80, the TBC thicknesses 67 are again measured 120. The table 70 in FIG. 3 includes the results of this second measurement 120 and shows the amount of TBC 15 that was removed during the process. Again, a second predetermined minimum thickness can be set at this stage of the process such that any blade 40 that includes a thickness 67 below the minimum is further repaired by stripping the TBC layer 15 and reapplying it as has been done in the past (See analysis step 125 in FIG. 1). In the present example, none of the blades 40 have a thickness 67 below this second predetermined minimum thickness such that all the blades 40 may proceed to the next step in the process.

As is well known, many turbine blades 40 and vanes 45, or other components, include internal passages and apertures formed in their surfaces to allow for cooling air flow through the blade 40 or vane 45. During the sponge blasting step 80, it is possible and likely that some media 95 will become lodged in the surface apertures and/or within the internal passages. To remove these unwanted remnants, the blades 40 are heated to a predefined temperature for a period of time (step 130). As discussed, the preferred sponge blast media 95 includes aluminum oxide embedded in a sponge base. The predefined temperature is selected to assure a complete burning of the sponge material such that all that remains is the aluminum oxide material. The particle size of the aluminum oxide is sufficiently small that it can be removed by flushing the passages with high-pressure air, water, or another fluid as may be desired. In one construction, the blades 40 and vanes 45 are heated to about 1000 to 1200 degrees Fahrenheit (538-649 degrees Celsius) plus or minus 20 percent for about one hour. With other applications requiring higher or lower temperatures and longer or shorter hold times. In addition, in most applications it is desirable to slowly heat the components as rapid heating can induce thermal stress and can cause damage or distortion of the components.

In the next step, the blade 40 or other component is subjected to an atmospheric plasma spray (APS) coating process 135 to improve the uniformity of the TBC 15 surfaces. Once this coating step 135 is completed, the blades 40, or other components can be cleaned to remove any debris or overspray, any internal passages can be cleaned, and the blade 40 or other component can be subjected to additional analysis, examination, or testing and then returned to service.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method of cleaning a component comprising:
   providing the component following an operation of the component in a high temperature environment of a gas turbine, the component including a thermal barrier coating (TBC) that defines a layer in-between a surface of a base material of the component and an exterior surface of the TBC;
   cleaning the TBC of the component using a sponge jet blasting process; the sponge jet blasting process configured to remove a limited thickness of TBC and
   measuring a cleaned thickness of the TBC to verify that the cleaned thickness exceeds a predetermined minimum value that will allow the return of the component to the high temperature environment of the gas turbine.

2. The method of claim 1, wherein the component includes a blade from a gas turbine.

3. The method of claim 1, further comprising selecting a feed pressure for the sponge jet blasting process.

4. The method of claim 1, further comprising measuring a start thickness of the TBC to verify that the start thickness is greater than a predetermined threshold value.

5. The method of claim 4, further comprising comparing the start thickness to the cleaned thickness to determine a value of the limited thickness of the TBC.

6. The method of claim 5, wherein the removed thickness is less than 0.001 inches (0.025 mm).

7. The method of claim 1, further comprising applying one and only one pass of atmospheric plasma spray spray/coat.

8. The method of claim 1, wherein the component includes one of a transition, a basket, and a support housing.

9. A method of cleaning a component comprising:
   providing a component that has operated in a high temperature environment of a gas turbine, the component including a thermal barrier coating (TBC) that defines a layer in-between a surface of a base material of the component and an exterior surface of the TBC;
   measuring a first thickness of the TBC of the component to verify that the first thickness is greater than a predetermined threshold value;
   selecting an operating parameter of a sponge jet blasting process;
   cleaning the TBC of the component using the sponge jet blasting process; and
   measuring a second thickness of the TBC of the component to determine the amount of TBC removed during the cleaning and to verify that the second thickness of the TBC of the component exceeds a predetermined minimum value that will allow the return of the component to the high temperature environment of the gas turbine.

10. The method of claim 9, wherein the component includes one of a transition, a basket, and a support housing.

11. The method of claim 9, wherein the component includes a blade from a gas turbine.

12. The method of claim 9, wherein the operating parameter is a feed pressure for the sponge jet blasting process.

13. The method of claim 9, wherein the amount of TBC removed is less than 0.001 inches (0.025 mm).

14. The method of claim 9, further comprising applying one pass of APS spray/coat to the component.

15. The method of claim 9, further comprising applying a second pass of APS spray/coat to the component.

16. The method of claim 9, further comprising using an eddy current process to measure the first thickness and the second thickness.

* * * * *